(12) United States Patent
Peterson et al.

(10) Patent No.: US 11,987,594 B1
(45) Date of Patent: May 21, 2024

(54) MULTIVARIATE CARBOXYLATE DERIVATIZED PHENYL-BASED METAL-ORGANIC FRAMEWORKS

(71) Applicant: U.S. Army Combat Capabilities Development Command, Chemical Biological Center, APG, MD (US)

(72) Inventors: Gregory W. Peterson, Belcamp, MD (US); Thomas H. Epps, III, Newark, DE (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 0 days.

(21) Appl. No.: 17/956,226

(22) Filed: Sep. 29, 2022

Related U.S. Application Data

(63) Continuation of application No. 16/709,258, filed on Dec. 10, 2019, now Pat. No. 11,459,342.

(51) Int. Cl.
 *B01J 31/22* (2006.01)
 *B01D 53/58* (2006.01)
 (Continued)

(52) U.S. Cl.
 CPC ............... *C07F 1/08* (2013.01); *B01D 53/58* (2013.01); *B01D 53/62* (2013.01);
 (Continued)

(58) Field of Classification Search
 None
 See application file for complete search history.

(56) References Cited

PUBLICATIONS

Lalonde et al., "Transmetalation: routes to metal exchange within metal-organic frameworks." J. Mater. Chem. A (2013), 1, 5453-5468.*

Venna et al., "Fabrication of MMMs with improved gas separation properties using externally-functionalized MOF particles." Mater. Chem. A (2015), 3, 5014-5022.*

Zhang et al., "Ruthenium Metal-Organic Frameworks with Different Defect Types: Influence on Porosity, Sorption, and Catalytic Properties." Chem. Eur. J. (2016) vol. 22, pp. 14297-14307 (also including Supplementary Information sheets).*

(Continued)

*Primary Examiner* — Daniel Berns
(74) *Attorney, Agent, or Firm* — Ulysses John Biffoni

(57) ABSTRACT

A composition having the structure of formula I:

$$[R-Ar-(COOH)_2]_x[Ar-(COOH)_3]_{2-x}M_3^{2+} \quad (I)$$

is provided where M is Mn, Cu, Co, Fe, Zn, Cd, Ni, or Pt; R is a bromine, nitro, a primary amine, $C_1$-$C_4$ alkyl secondary amine, $C_1$-$C_4$ alkyl oxy, Br—($C_1$-$C_4$ alkyl), $NO_2$—($C_1$-$C_4$ alkyl), a mercaptan, and reaction products of any of the aforementioned with acyl chlorides of the formulas: $CH_3(CH_2)_mC(O)Cl$, or $CH_3(CH(C_1$-$C_4$ alkyl)$CH_2)_mC(O)Cl$, or $CH_3(CH_2)_m$-Ph-$(CH_2)_pC(O)Cl$, where Ph is a $C_6$ phenyl or $C_6$ phenyl with one or more hydrogens replaced with F, $C_1$-$C_4$ fluoroalkyl, or $C_1$-$C_4$ perfluoroalkyl; m is independently in each occurrence an integer of 0 to 12 inclusive; p is an integer of 0 to 36 inclusive, to form an amide, a thioamide, or an ester; Ar is a 1,3,5-modified phenyl, and $1.4>x>0$. A process of synthesis thereof and the use to chemically modify a gaseous reactant are also provided.

10 Claims, 18 Drawing Sheets
(18 of 18 Drawing Sheet(s) Filed in Color)

(51) Int. Cl.
    *B01D 53/62*        (2006.01)
    *B01D 67/00*        (2006.01)
    *B01D 69/12*        (2006.01)
    *B01D 71/02*        (2006.01)
    *B01D 71/82*        (2006.01)
    *B01J 31/16*         (2006.01)
    *C07F 1/08*         (2006.01)

(52) U.S. Cl.
    CPC ......... *B01D 67/0079* (2013.01); *B01D 69/12* (2013.01); *B01D 71/022* (2013.01); *B01D 71/82* (2013.01); *B01D 2257/406* (2013.01); *B01D 2257/504* (2013.01); *B01D 2257/93* (2013.01); *B01D 2258/0283* (2013.01); *B01D 2323/39* (2013.01)

(56) References Cited

PUBLICATIONS

Denny et al., "In Situ Modification of Metal-Organic Frameworks in Mixed-Matrix Membranes." Angew. Chem. Int. Ed. (2015) vol. 54 , pp. 9029-9032 (also including Supplementary Information sheets).*

Song et al., "Transmetalations in two metal-organic frameworks with different framework flexibilities: Kinetics and core-shell heterostructure." CrystEngComm, 2012, 14, 5753-5756.*

Suh et al., "High Gas Sorption and Metal-Ion Exchange of Microporous Metal-Organic Frameworks with Incorporated Imide Groups." Chem. Eur. J., 2010, 16, 14043-14050.*

\* cited by examiner

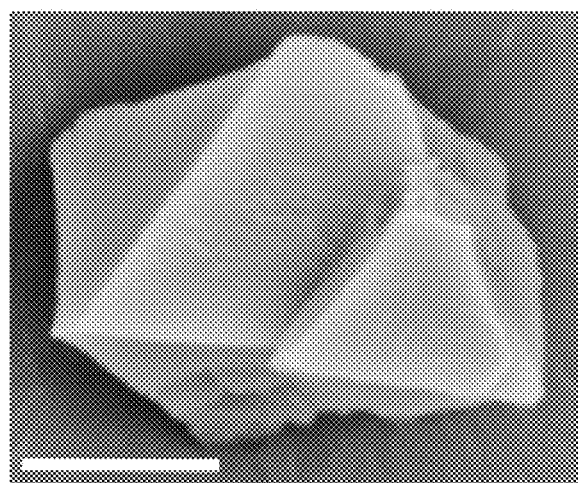
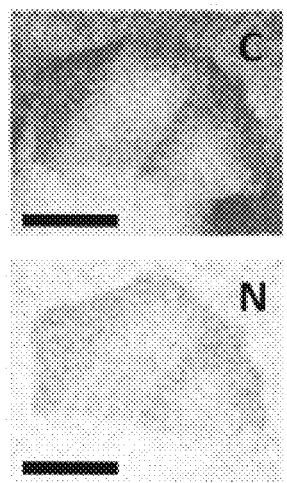
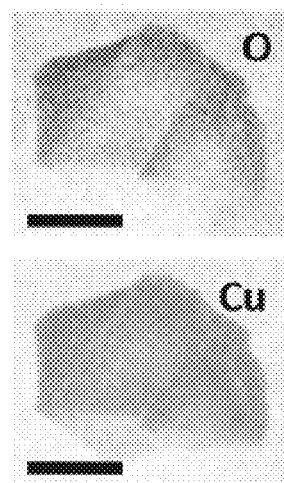
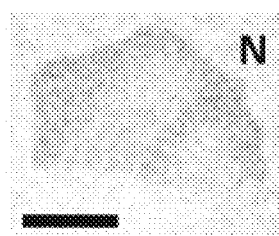
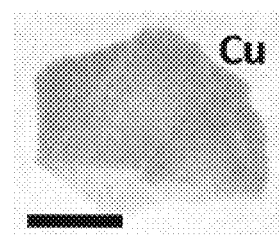
FIG. 5B    FIG. 5C
FIG. 5A    FIG. 5D    FIG. 5E

MULTIVARIATE CARBOXYLATE DERIVATIZED PHENYL-BASED METAL-ORGANIC FRAMEWORKS

RELATED APPLICATIONS

This application is a continuation application of U.S. patent application Ser. No. 16/709,258 filed on Dec. 10, 2019, now U.S. Pat. No. 11,459,342, which is commonly assigned and which claimed the benefit of priority of U.S. provisional patent application Ser. No. 62/781,938 filed Dec. 19, 2018.

GOVERNMENT INTEREST

The invention described herein may be manufactured, used and licensed by or for the U.S. Government.

FIELD OF THE INVENTION

The invention relates in general to metal-organic frameworks (herein referred to as MOFs), and in particular to a MOF containing an amine moiety in a linker therein while other linkers may lack an amine moiety.

BACKGROUND OF THE INVENTION

Metal-organic frameworks (MOFs) are porous inorganic-organic hybrid crystalline materials formed by metal ions or metal clusters connected by covalent bonds between metal orbitals and organic ligands. MOFs, accordingly, have properties of both organic and inorganic materials. Attractive aspects of MOFs include high porosity and surface area, well-regulated and tunable pore structure, and tunable structural diversity. MOF membranes and composite materials are used in the filtration of liquid and some gaseous media.

MOFs are a class of materials currently being widely investigated for various applications, such as separations, storage, catalysis, filtration, decontamination, and sensing, among others. MOFs are comprised of secondary building units (SBUs), typically made from metal oxide clusters) connected by organic linkers. The resulting structure is an extended, 3-dimensional framework that often is highly porous. Due to the ability to change/tune both the SBU (e.g., changing metal type) and organic linker (e.g., tuning hydrophobicity, affinity to analytes, substrates using higher molecular weight/sterically hindered/longer linkers), an incredibly broad range of structures is possible.

There are multiple sub-groups of MOFs, such as isoreticular MOFs (IRMOFs), Materials Institut Lavoisier (MIL) MOFs, zeolitic imidazolate frameworks (ZIFs), and others. Typically, these groupings are defined by the similarities of the structures. For example, most IRMOFs contain zinc acetate SBUs, and changing the linker results in a wide range of porous structures. Yet, IRMOFs are not stable to water.

CuBTC (copper benzene-1,3,5-tricarboxylate), also known as HKUST-1 and $Cu_3BTC_2$, typically is made from a copper salt, such as copper nitrate, and 1,3,5-benzentricarboxylic acid. The MOF has a high surface area and has been shown to provide excellent removal of toxic chemicals such as ammonia. However, the MOF structure rapidly degrades upon exposure to water. Several approaches such as plasma-enhanced chemical vapor deposition and imbedding CuBTC in a mixed matrix composite have resulted in improved stabilization of the material.

One of the key parameters in the processing of polymer/nanoparticle composites is the colloidal behavior of the nanoparticle in solution. Specifically, favorable interactions between the nanoparticle, polymer, and solvent generally lead to better suspension and subsequent composites. In electrospinning, the ability of the nanoparticle to stay in suspension longer enables longer spinning times and better overall dispersion of the nanoparticle in/on the fiber. MOFs containing amine groups can be modified using acyl chloride chemistry to form amides that can be used to tune polymer/nanoparticle interactions. The acyl chloride may have a variety of functionalities, such as aliphatic, aryl, and fluorinated groups, that can be tailored for specific MOF-polymer interactions.

Thus, there exists a need for a chemically modified CuBTC that provides enhanced interactions with polymers relative to native CuBTC. There further exists a need for the appropriate dispersion of chemically modified CuBTC associated with use in polymeric fiber applications. Still further, there exists a need for a humidity/moisture stable version of CuBTC.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A composition having the structure of formula I:

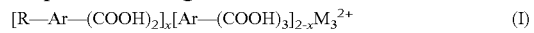

$$[R-Ar-(COOH)_2]_x[Ar-(COOH)_3]_{2-x}M_3^{2+} \quad (I)$$

is provided where M is Mn, Cu, Co, Fe, Zn, Cd, Ni, or Pt; R is a bromine, nitro, a primary amine, $C_1$-$C_4$ alkyl secondary amine, $C_1$-$C_4$ alkyl oxy, Br—($C_1$-$C_4$ alkyl), $NO_2$—($C_1$-$C_4$ alkyl), a mercaptan, and reaction products of any of the aforementioned with acyl chlorides of the formulas: $CH_3(CH_2)_mC(O)Cl$, or $CH_3(CH(C_1$-$C_4$ alkyl)$CH_2)_mC(O)Cl$, or $CH_3(CH_2)_m$-Ph-$(CH_2)_pC(O)Cl$, where Ph is a $C_6$ phenyl or $C_6$ phenyl with one or more hydrogens replaced with F, $C_1$-$C_4$ fluoroalkyl, or $C_1$-$C_4$ perfluoroalkyl; m is independently in each occurrence an integer of 0 to 12 inclusive; p is an integer of 0 to 36 inclusive, to form an amide, a thioamide, or an ester; Ar is a 1,3,5-modified phenyl, and x is a non-integer value of greater than 0 and less than 1.4.

A process of modifying metal benzene-1,3,5-tricarboxylate to form a crystalline metal-organic framework (MOF) that includes the reaction in a solution of a metal ion with benzene-1,3,5-tricarboxylate and a ligand, R—Ar—$(COOH)_2$, where R is a bromine, nitro, a primary amine, $C_1$-$C_4$ alkyl secondary amine, $C_1$-$C_4$ alkyl oxy, Br—($C_1$-$C_4$ alkyl), $NO_2$—($C_1$-$C_4$ alkyl), a mercaptan; Ar is a 1,3,5-modified phenyl, in a stoichiometric ratio between of 2-x:x and x is a non-integer value of greater than 0 and less than 1.4. A crystalline MOF forms after a sufficient time. Metal ions operative herein include Mn, Cu, Co, Fe, Zn, Cd, Ni, and Pt.

A process of selectively separating a constituent from a gas that includes a gas mixture containing the constituent being exposed to a composition of formula (I). A flue gas is collected that is preferentially depleted in the constituent after contact with the composition. Exemplary constituents are carbon dioxide, ammonia, and chemical warfare agents. The process is compatible with flue gases containing water vapor or dinitrogen.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-5E are an SEM micrograph (FIG. 5A) and energy dispersive X-ray spectroscopy (EDS) images for a CuBTC_20 AIA made with copper acetate for illuminating the distributions of carbon (FIG. 5B), oxygen (FIG. 5C), nitrogen (FIG. 5D), and copper (FIG. 5E);

FIGS. 11A-11D are images of water vials of CuBTC_20 AIA (FIG. 11A) and CuBTC_20 AIA_D (FIG. 11B) in water at 0 min and 1 month (FIG. 11C, and FIG. 11D, respectively) it is noted that without DC modification, the material sunk to the bottom, while DC-modified particles floated on top of the water;

DETAILED DESCRIPTION OF EMBODIMENTS OF THE INVENTION

Figures 1A, 1B, 1C, 1D:
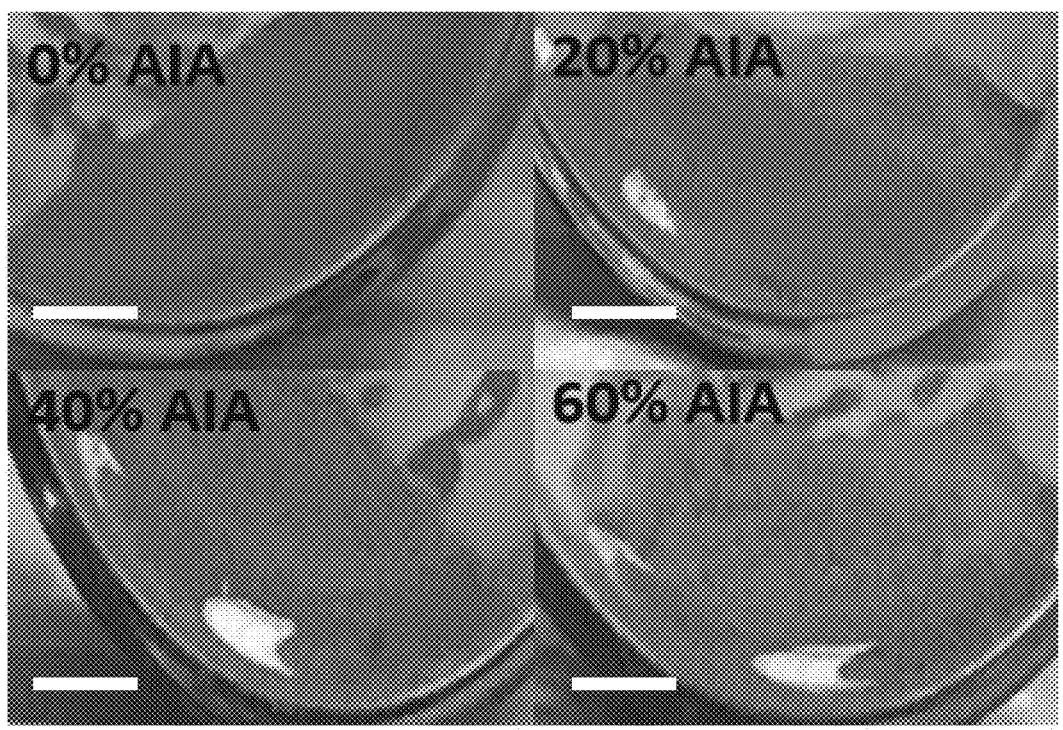
FIGS. 1A-1D are optical images of the inventive CuBTC_AIA at 0% (FIG. 1A), 20% (FIG. 1B), 40% (FIG. 1C), and 60% (FIG. 1D), with 0% 5-aminoisophthalic acid (ALA) being blue while the successive addition of AIA resulted in green crystals, where the scale bars denotes 1 cm.
Figures 2A, 2B, 2C, 2D:
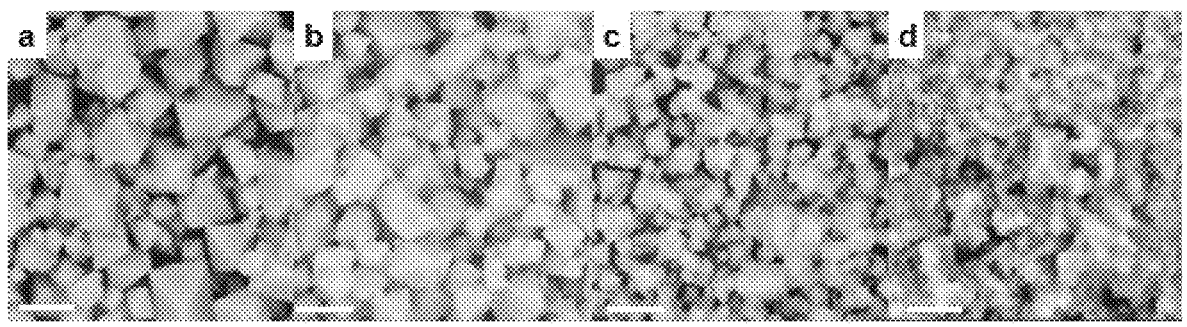
FIGS. 2A-2D are scanning electron microscope (SEM) micrographs FIG. 2. SEM images of MOFs synthesized with (FIG. 2A-a) 0%, (FIG. 2B-b) 20%, (FIG. 2C-c) 40%, and (FIG. 2D-d) 60 mol % AIA, where the scale bar is 10 microns; it is noted that as the amount of AIA increases, a secondary phase forms.

The following description of embodiments of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-3, 2-4, 3-4, and 1-4.

The invention has utility for the filtration and reaction of chemicals that illustratively include chemical warfare agents (CWAs), CWA simulants, ammonia, and other toxic gases such as hydrogen sulfide, arsine, chlorine, and nitrogen dioxide, among others, along with other uses that are detailed hereafter to include gas storage alone or in combination with gas scrubbing. It is surprisingly shown that the novel compositions detailed herein have modified stability and reactivity profiles relative to the prior art CuBTC material through amine modification thereof.

In some inventive embodiments, the amine is subsequently reacted via acyl chloride chemistry. The modification is used to manipulate the behavior of the MOF, which includes dispersion/suspension behavior in solvents, dispersion in electrospun nano/microfibers, and dispersion in polymer-based films. The ability to disperse the same MOF in different polymers has wide-reaching implications in a variety of applications, including clothing, protective suits, filtration, sensors, and mixed matrix membranes and composites. Furthermore, the modification further stabilizes the MOF to water and ammonia, and the resulting materials have increased selectivity for carbon dioxide over nitrogen and water in comparison to the baseline MOF.

An inventive composition is provided that has for structure of formula I:

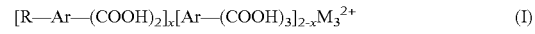

where M is Mn, Cu, Co, Fe, Zn, Cd, Ni, or Pt; R is a bromine, nitro, a primary amine, $C_1$-$C_4$ alkyl secondary amine, $C_1$-$C_4$ alkyl oxy, Br—($C_1$-$C_4$ alkyl), $NO_2$—($C_1$-$C_4$ alkyl), a mercaptan, and reaction products of any of the aforementioned with acyl chlorides of the formulas: $CH_3(CH_2)_mC(O)Cl$, or $CH_3(CH(C_1$-$C_4$ alkyl)$CH_2)_mC(O)Cl$, or $CH_3(CH_2)_m$-Ph-$(CH_2)_pC(O)Cl$, where Ph is a $C_6$ phenyl or $C_6$ phenyl with one or more hydrogens replaced with F, $C_1$-$C_4$ fluoroalkyl, or $C_1$-$C_4$ perfluoroalkyl; m is independently in each occurrence an integer of 0 to 12 inclusive; p is an integer of 0 to 36 inclusive, to form amides, thioamides, or esters; Ar is a 1,3,5-modified phenyl, and x is a non-integer value of greater than 0 and less than 1.4. In some inventive embodiments, x is between 0.1 and 1.24. In still other inventive embodiments, x is between 0.3 and 0.9. Exemplary of the inventive ligand, R—Ar—$(COOH)_2$ independently in each occurrence are 5-aminoisophthalic acid (AIA), 5-hydroxyisophthalic acid, 5-methoxyisophthalic acid, 5-thioisophthalic acid, 5-bromoisophthalic acid, and 5-nitroisophthalic acid. An inventive composition (I) exhibits enhanced properties such as moisture stability and selectivity towards ammonia and carbon dioxide relative to the baseline CuBTC MOF. CuBTC, also known as HKUST-1 and $Cu_3BTC_2$, is a well-known and well-studied MOF. These synonyms are used interchangeably hereafter. The synthesis of HKUST-1 is known to the art: S. S.-Y. Chui, S. M.-F. Lo, J. P. H. Charmant, A. G. Orpen, and I. D. Williams, "A Chemically Functionalizable Nanoporous Material $[Cu_3(TMA)_2(H_2O)_3]n$", Science, 1999, 283, 1148-1150.

An inventive composition (I) further detailed herein with respect to structures inclusive of the ligand AIA. It is appreciated that other precursors detailed herein are extendible from the reaction conditions and characterization detailed herein for AIA inclusive compositions through routine modification of reaction conditions and stoichiometry. An inventive composition (I) is isostructural to CuBTC (referred to hereafter with respect to the AIA inclusive composition as CuBTC_AIA) containing a combination of BTC and AIA.

A modified CuBTC_AIA in which the amine group is converted to an amide through acyl chloride chemistry is also detailed herein. The acyl chloride may have a variety of functionalities, including aliphatic, aryl, and fluorinated groups, as detailed in composition (I). Acyl chloride reaction conditions with primary amines, and thiols are conventional to the art as detailed in B. C. Ranu, S. S. Deya and A. Hajraa, "Highly efficient acylation of alcohols, amines and thiols under solvent-free and catalyst-free conditions", Green Chem., 2003, 5, 44-46.

An inventive composition (I) is readily incorporated into polymers through techniques illustratively including electrospinning from solutions, spin coating, extruder injection, melt-blowing, blow molding, flow coating, dip coating, blade coating, roll-to-roll, spray coating, and general film-forming techniques. Polymers suitable for usage herein illustratively include a monomeric polymer illustratively including but not limited to polyimide, polystyrene, polyurethane, poly(vinylidene fluoride), poly(ethylene oxide) or poly(ethyleneglycol), polyacrylonitrile, or poly(vinyl chloride); copolymers illustratively including a sulfonated tetrafluoroethylene, poly(styrene-block-butadiene-block-styrene), poly(styrene-block-isoprene-block-styrene, poly(acrylonitrile-co-butadiene-co-styrene), poly(styrene-block-ethylene-co-butylene-block-styrene), poly(styrene-block-ethylene-co-propylene-block-styrene); elastomers illustratively including polydimethylsiloxane, polychloroprene, polyurethane, nitrile, and latex; an alkylene such as low-density polyethylene, first grade polyethylene, and polypropylene; or water soluble polymers that illustratively include albumin, polyvinyl alcohol, polyethylenimine, polyvinylpyrrolidone, ethylene-vinyl acetate, and polyethylene-vinyl acetate. It is appreciated that the acyl chloride chemistry of the present invention is readily adjusted using conventional techniques to polymers beyond the aforementioned illustrative recitation.

An inventive composition (I) is readily incorporated into equipment for military personnel or first responders. With a material having a porous matrix through with a fluid gas or liquid can transit, an inventive material is amenable to usage as a filter and/or barrier in equipment such as masks, helmets, or full-body protective gear. It is appreciated that an inventive composite is also amenable as a surface coating that passively sorbs and decontaminates chemical warfare agents or carbon dioxide thereby finding applications that illustratively include protective gear, and rebreather equipment. It is appreciated that an inventive composition is readily adhered to particle fibers; incorporated into polymeric or inorganic foams; porous polymeric matrices; or suspended in coating compositions that cure or solvent evaporation dry to form a surface coating, such a latexes or polyurethane varnishes. It is appreciated that an inventive composition (I) also has application as an organo-metallic catalyst with tunable properties including water stability, and steric hinderance.

The present invention is further detailed with respect to the following non-limiting examples. These examples are not intended to limit the scope of the invention but rather highlight properties of specific inventive embodiments and the superior performance thereof relative to comparative examples.

EXAMPLES

Example 1—Synthesis of CuBTC AIA $Cu(NO_3)_2 \cdot 3H_2O$ (250 mg, 1.0 mmol) is added to an equal volume mixture of water/ethanol/dimethylformamide (DMF) (3 mL) in a 20 mL scintillation vial and stirred magnetically at 300 rpm. Separately, 1,3,5-benzenetricarboxylic acid (BTC, 140 mg, 0.66 mmol) is added to an equal volume mixture of water/ethanol/DMF (3 mL) in a 20 mL scintillation vial and stirred magnetically at 300 rpm. When all components are dissolved, the solutions are combined for 24 or 72 hours (h) to study the effect of time on crystal formation. Crystallization is conducted at temperatures of 25, 50, or 85° C. After synthesis, the solutions are decanted and washed with DMF two times, and then decanted and washed with ethanol two times. The crystals are vacuum-filtered and activated under a vacuum ($\sim 1 \times 10^{-2}$ bar) and 120° C. prior to characterization and testing.

AIA is added at 20, 40, and 60 mol % (with respect to total linker content) as described in Table 1.

TABLE 1

Synthesis quantities for CuBTC and CuBTC_AIA samples.

| Material* | BTC mmol | BTC mg | AIA mmol | AIA mg | mol % AIA | $Cu(NO_3)_2$: Linker |
|---|---|---|---|---|---|---|
| CuBTC | 0.6 | 14 | 0 | 0 | 0 | 1.55 |
| CuBTC_20 AIA | 0.5 | 11 | 0.1 | 25 | 21 | 1.56 |

TABLE 1-continued

Synthesis quantities for CuBTC and CuBTC_AIA samples.

| Material* | BTC mmol | BTC mg | AIA mmol | AIA mg | mol % AIA | Cu(NO$_3$)$_2$: Linker |
|---|---|---|---|---|---|---|
| CuBTC_40 AIA | 0.4 | 85 | 0.2 | 50 | 41 | 1.52 |
| CuBTC_60 AIA | 0.2 | 55 | 0.4 | 75 | 61 | 1.53 |

*All materials are synthesized with 250 mg (1 mmol) Cu(NO$_3$)$_2$·H$_2$O

As shown in FIGS. 1A-1D, material synthesized with 0% AIA was blue, while the increasing addition of AIA resulted in green crystals. Characterization data for materials synthesized at different temperatures and times are summarized in the drawings using the following example notation: CuBTC_20 AIA_25C$_{72}$h refers to the material synthesized with 20 mol % AIA at a temperature of 25° C. for 72 h.

Example 2—Varied Synthesis of CuBTC AIA

An alternative method using copper acetate, instead of copper nitrate, is employed for synthesis to remove nitrogen, other than that in AIA, from the formulation for elemental mapping purposes. Cu(CO$_2$CH$_3$)$_2$·H$_2$O (1 g, 5.0 mmol) is dissolved in H$_2$O (30 mL). For CuBTC, BTC (0.63 g, 3.0 mmol) is dissolved in ethanol (30 mL). For CuBTC_20 AIA, BTC (500 mg, 2.4 mmol) and AIA (100 mg, 0.55 mmol) is dissolved in ethanol (30 mL) at 50° C. The solutions are combined in rapid stirring (1000 rpm) for 24 h, washed with ethanol, and then vacuum filtered.

Example 3—Characterization of CuBTC_AIA

FIGS. 2A-2D are scanning electron microscope (SEM) images of MOFs synthesized with (d) 0, (e) 20, (f) 40, and (g) 60 mol % AIA. Scale bar=10 μm. As the amount of AIA increases, a secondary phase forms that corresponds with green crystals observed in the optical images of FIGS. 1B-D.

Figure 3:
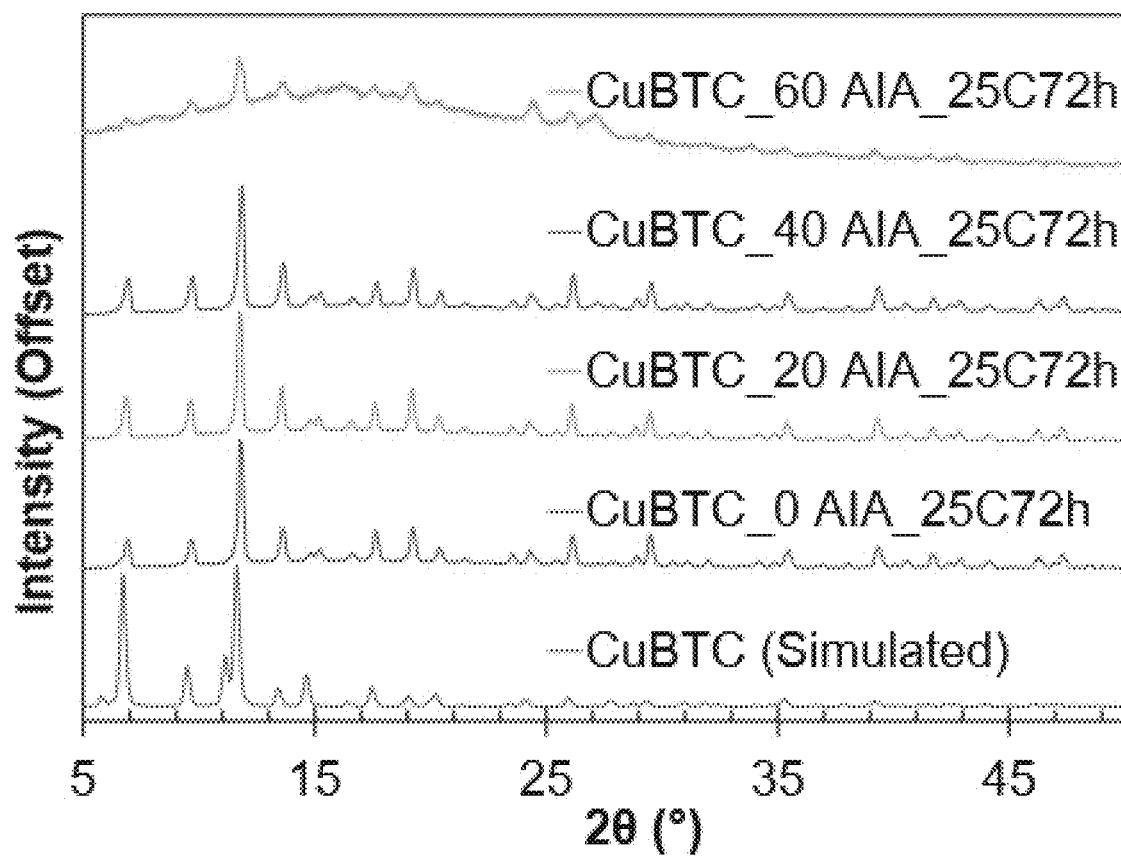
FIG. 3 is powder X-ray diffraction patterns of the inventive CuBTC_AIA MOF synthesized at 25° C. for 72 h for varying amounts of AIA per FIGS. 2A-2D, a secondary phase formed as shown by peaks at approximately 8.4° 2θ for the 60% ALA sample with other modifications being isostructural with CuBTC, a simulated CuBTC is provided for context.

FIG. 3 is a series of powder X-ray diffraction (PXRD) patterns of CuBTC_AIA MOF synthesized at 25° C. for 72 h. A secondary phase formed as shown by peaks at approximately 8.4° 2θ for the 60% AIA sample. All other modifications are isostructural with CuBTC.

Figure 4:
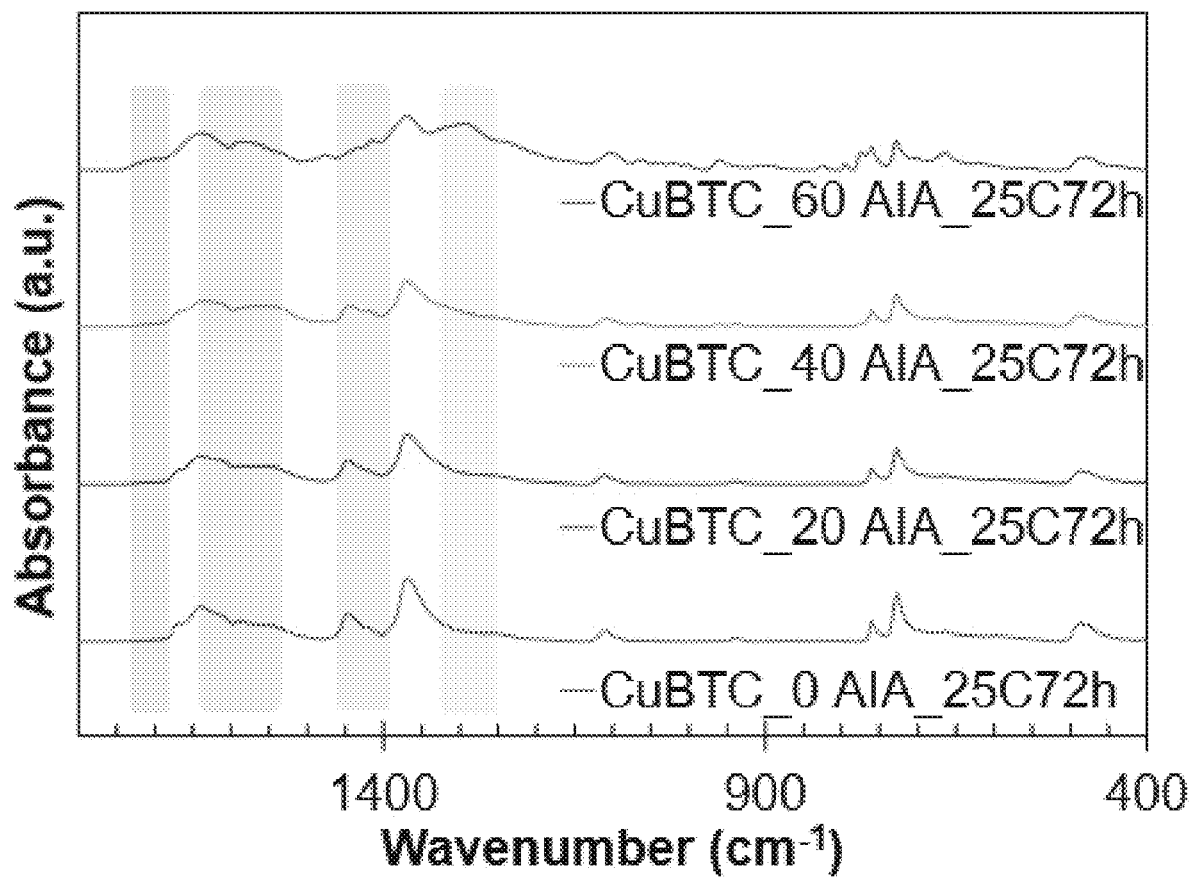
FIG. 4 is a series of plots of attenuated total reflectance Fourier transform infrared (ATR-FTIR) spectroscopy of CuBTC_AIA MOF synthesized at 25° C. for 72 h, with amounts of AIA of (0%, 20%, 40%, and 60%)

FIG. 4 is a plot of attenuated total reflectance—Fourier transform infrared spectroscopy of CuBTC_AIA MOF synthesized at 25° C. for 72 h. The region in blue at ~1625 cm$^{-1}$ is associated with ρ(N—H) and increased with increased amount of AIA. As the amount of AIA increased, a broad peak at ~1700 cm$^{-1}$ appeared for the samples synthesized at 25° C. This peak is assigned to ν(C=O) from uncoordinated carboxylate groups and indicated that part of the BTC or AIA did not crystalize into the MOF. The peak at 1410 cm$^{-1}$ increased relative to the peak at 1442 cm$^{-1}$ as the amount of AIA increased. BTC had two peaks from ν(C—O), whereas AIA only had one pronounced peak at ~1410 cm$^{-1}$. Thus, the increase in the 1410 cm$^{-1}$, peak is indicative of incorporation of AIA into the structure at the expense of BTC. A broad peak at ~1350 cm$^{-1}$ consistent with an aromatic ν(C—N) also appeared with increased amount of AIA.

FIGS. 5A-5E are an SEM (FIG. 5A) and energy dispersive X-ray spectroscopy (EDS) images (FIGS. 5B-E) for CuBTC_20 AIA made with copper acetate illuminating distributions of carbon (FIG. 5B), oxygen (FIG. 5C), nitrogen (FIG. 5D), and copper (FIG. 5E).

Figure 6:
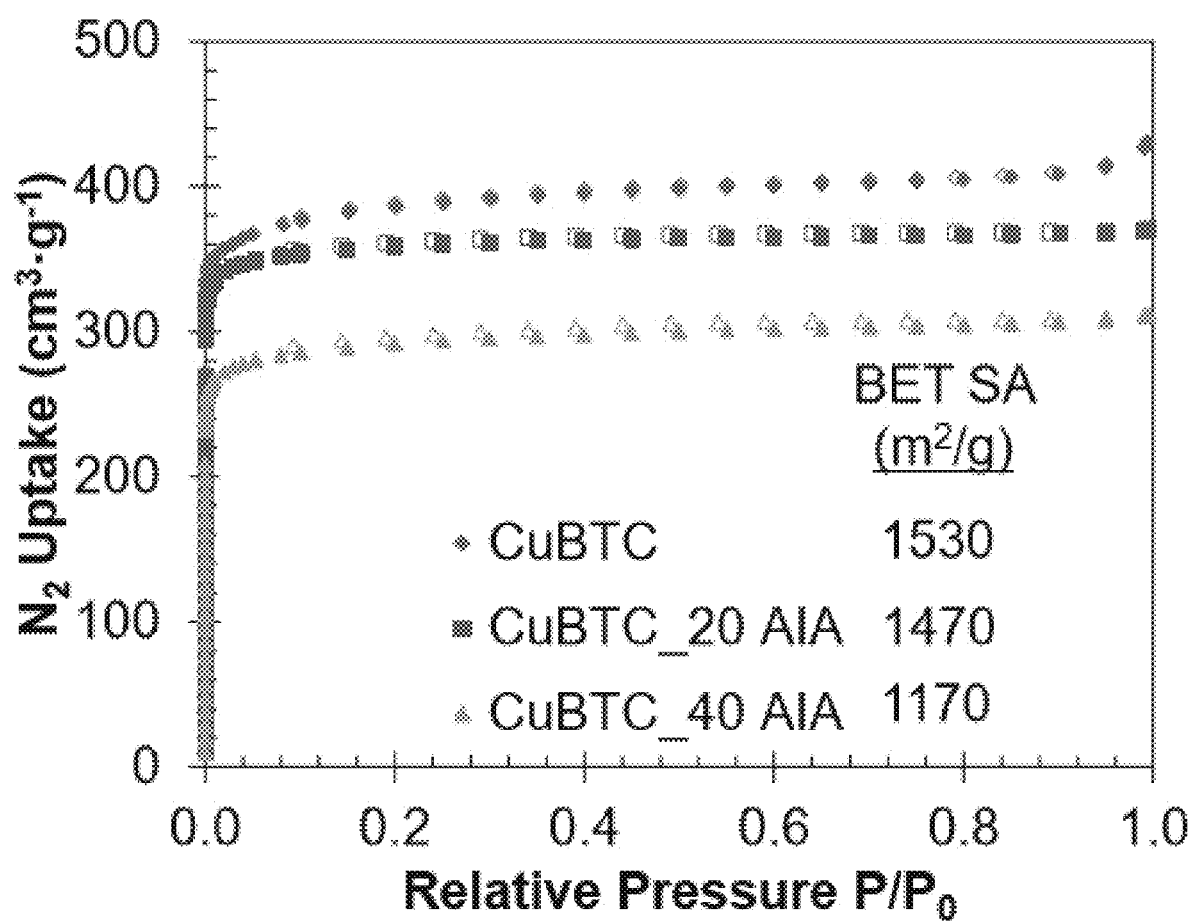
FIG. 6 is a series of nitrogen isotherms for CuBTC_AIA samples. CuBTC (0%) CuBTC_20 AIA (20% AIA) and CuBTC_40 AIA (40% AIA) as measured by Brunauer-Emmett-Teller (BET) analyses.

FIG. 6 is nitrogen isotherms for CuBTC_AIA samples of Example 1. CuBTC had a surface area of 1530 m$^2$/g, CuBTC_20 AIA had a surface area of 1470 m$^2$/g, and CuBTC_40 ALA had a surface area of 1170 m$^2$/g.

Example 4—Modification of CuBTC_AIA

CuBTC_20 AIA, and CuBTC_40 AIA are added into dichloromethane (5 mL, Sigma Aldrich) in a 20 mL scintillation vial. The MOFs are soaked for ~30 min and then sonicated for 30 s using a Fisher Scientific CL-18 probe sonicator at 70% amplitude. Immediately after sonication acyl chloride is added drop-wise to the solutions according to Table 2. The two acyl chlorides used are decanoyl chloride (DC) and 3,5-bis(trifluoromethyl)benzoyl chloride (BC). It is appreciated that the procedures provided herein are applicable to reaction with a variety of acyl chlorides per formula (I).

TABLE 2

Acyl chloride modifications to CuBTC and CuBTC_AIA samples.

| Sample | Mass (mg) | mmol AIA | Acyl chloride | Mass acyl chloride (mg) |
|---|---|---|---|---|
| CuBTC_D | 90 | — | DC | 11 |
| CuBTC_20 AIA_D | 120 | 0.08 | DC | 15 |
| CuBTC_20 AIA_B | 250 | 0.17 | BC | 20 |
| CuBTC_40 | 80 | 0.11 | DC | 45 |

Figure 7A:
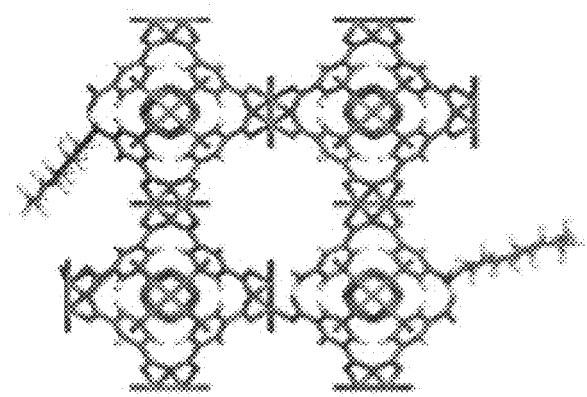
FIGS. 7A and 7B are schematic crystal structures of CuBTC_AIA showing the resulting amides formed from the reaction of the amine group from AIA with DC (FIG. 7A) and BC (FIG. 7B), where BC denotes 3,5-bis(trifluoromethyl)benzoyl chloride and DC denotes decanoyl chloride.
Figure 7B:
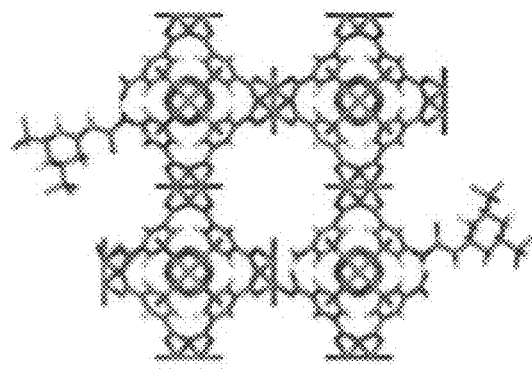

FIGS. 7A and 7B are crystal structure representations of CuBTC_AIA showing the resulting amides formed from the reaction of the amine group from AIA with DC (FIG. 7A) and BC (FIG. 7B).

Figure 8:
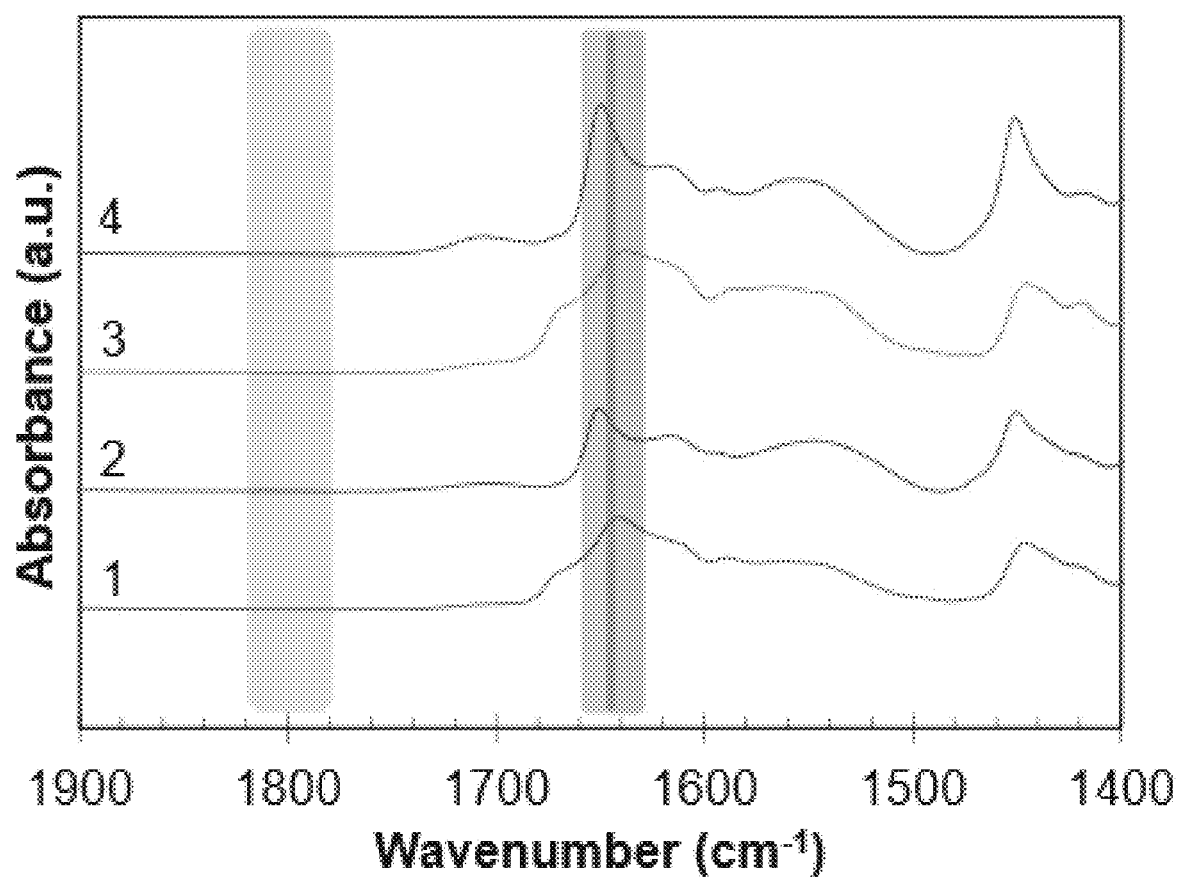
FIG. 8 is ATR-FTIR spectra showing a lack of an acyl chloride $v(C=O)$ at ~1800 cm$^{-1}$ (green region) indicative of DC reaction, the $\rho(N-H)$ of the as-synthesized MOFs disappeared at ~1635 cm$^{-1}$ (red region), and a peak associated with an amide $v(C=O)$ appeared at ~1650 cm$^{-1}$ (blue region), where the lines relate to CuBTC_AIA MOF synthesized at 25° C. for 72 h, with amounts of AIA of 0% (line 1), 20% (line 2), 40% (line 3), and 60% (line 4)

FIG. 8 is a series of ATR-FTIR spectra as noted in the legend. A lack of an acyl chloride ν(C=O) at ~1800 cm$^{-1}$ (green region) is indicative of DC reaction. The ρ(N—H) of the as-synthesized MOFs disappeared at ~1635 cm$^{-1}$ (red region), and a peak associated with an amide ν(C=O) appeared at ~1650 cm$^{-1}$ (blue region).

Example 5—Stabilization Against Water and Ammonia

MOFs (~5 mg) are added to water (~2 mL), stirred, and then allowed to sit for 24 h. After 24 h, the MOFs are vacuum-filtered and then evaluated for retention of crystallinity using PXRD at the same conditions specified in the Example 1. Ammonia breakthrough testing is conducted a microbreakthrough system that has been described previously. Ammonia from a concentrated ballast is mixed with a diluent stream at a rate necessary to achieve a challenge concentration of 2,000 mg·m$^{-3}$ at a total flow rate of 20 mL·min$^{-1}$ and relative humidity of 0% and 80%. MOFs (~5 mg) are challenged in a glass fritted tube (4 mm diameter) until the effluent concentration equaled the feed concentration. A mass balance is closed to calculate the ammonia capacity of the MOF. Ammonia concentration is measured using an HP5890 gas chromatograph equipped with a photoionization detector.

Figure 9:
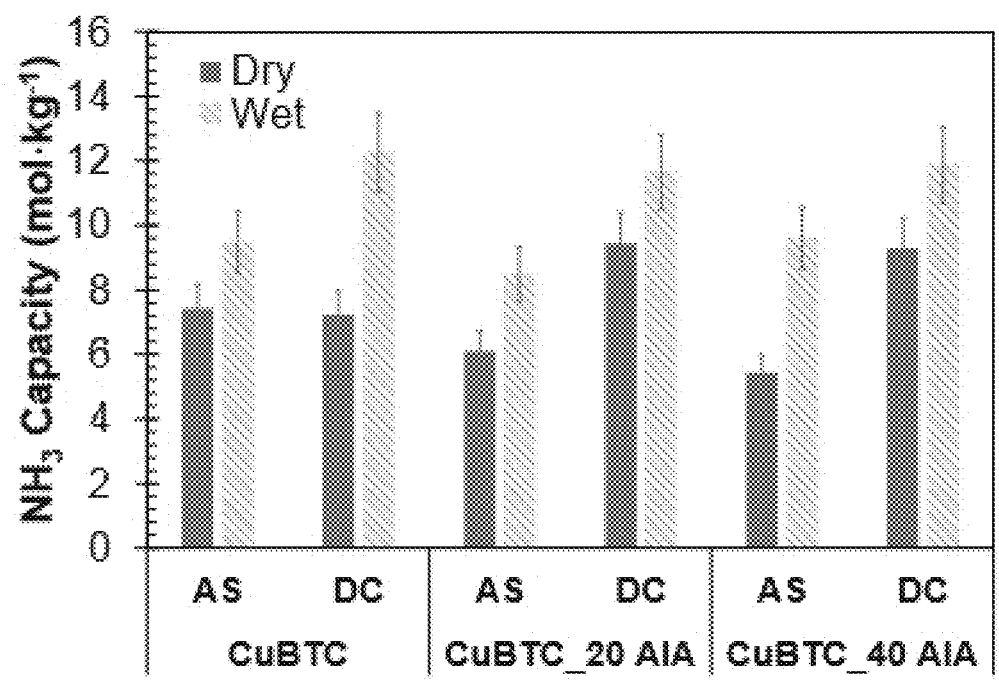
FIG. 9 is bar graph plots of ammonia ($NH_3$) capacity of CuBTC, CuBTC_20 AIA, and CuBTC_40 AIA with and without DC modification, in which AS refers to as-synthesized material without DC modification for dry conditions of 0% RH and wet conditions of 80% RH.
Figure 10:
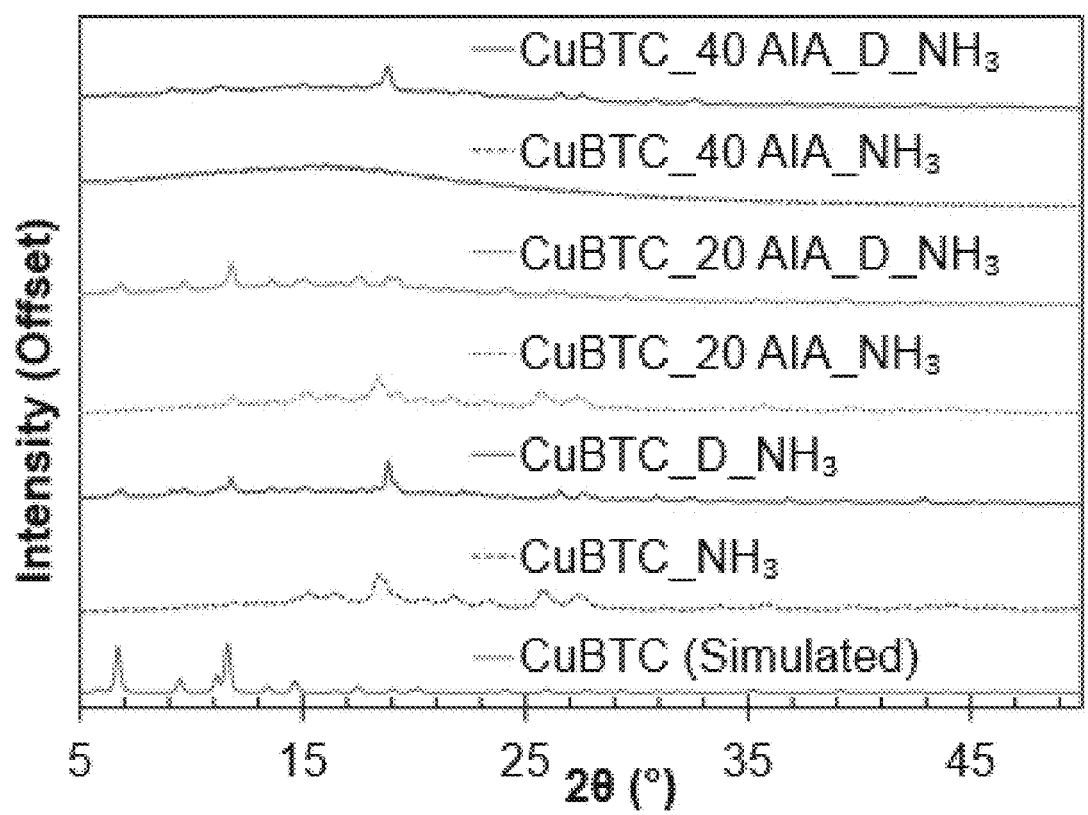
FIG. 10 is X-ray powder diffraction patterns of CuBTC, CuBTC_20 AIA, and CuBTC_40 AIA, with and without DC modification (denoted as "_D") after $NH_3$ exposure.

FIGS. 9 and 10 contain PXRD patterns for CuBTC, CuBTC_20 AIA, and CuBTC_40 AIA with and without DC modification (denoted as _D_) after NH$_3$ exposure. Without DC, all materials degraded after ammonia exposure. DC partially stabilized baseline CuBTC; however, degradation is seen as evidenced by the peak at ~8°, 2θ. CuBTC_20 AIA_D and CuBTC_40 AIA_D structures remained intact after NH$_3$ exposure.

Figures 11A, 11C, 11D:
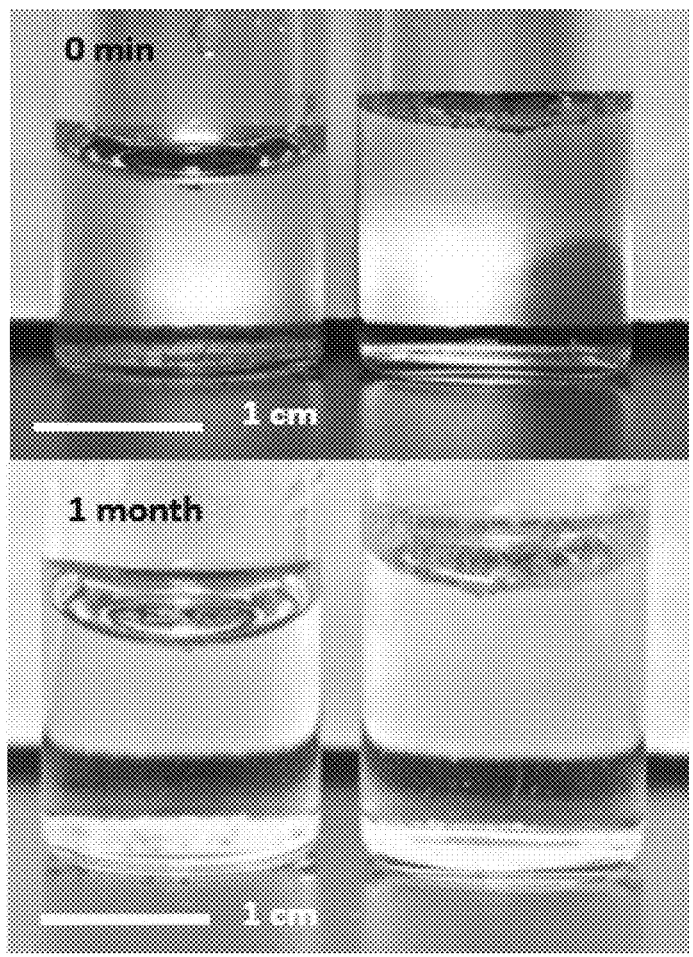

FIGS. 11A-11D are photos of CuBTC_20 AIA (FIG. 11A) and CuBTC_20 AIA_D (FIG. 11B) in water at 0 min and after 1 month (FIGS. 11C and 11D, respectively). Without DC, the material sunk to the bottom, while DC-modified particles floated on top of the water.

Figure 12:
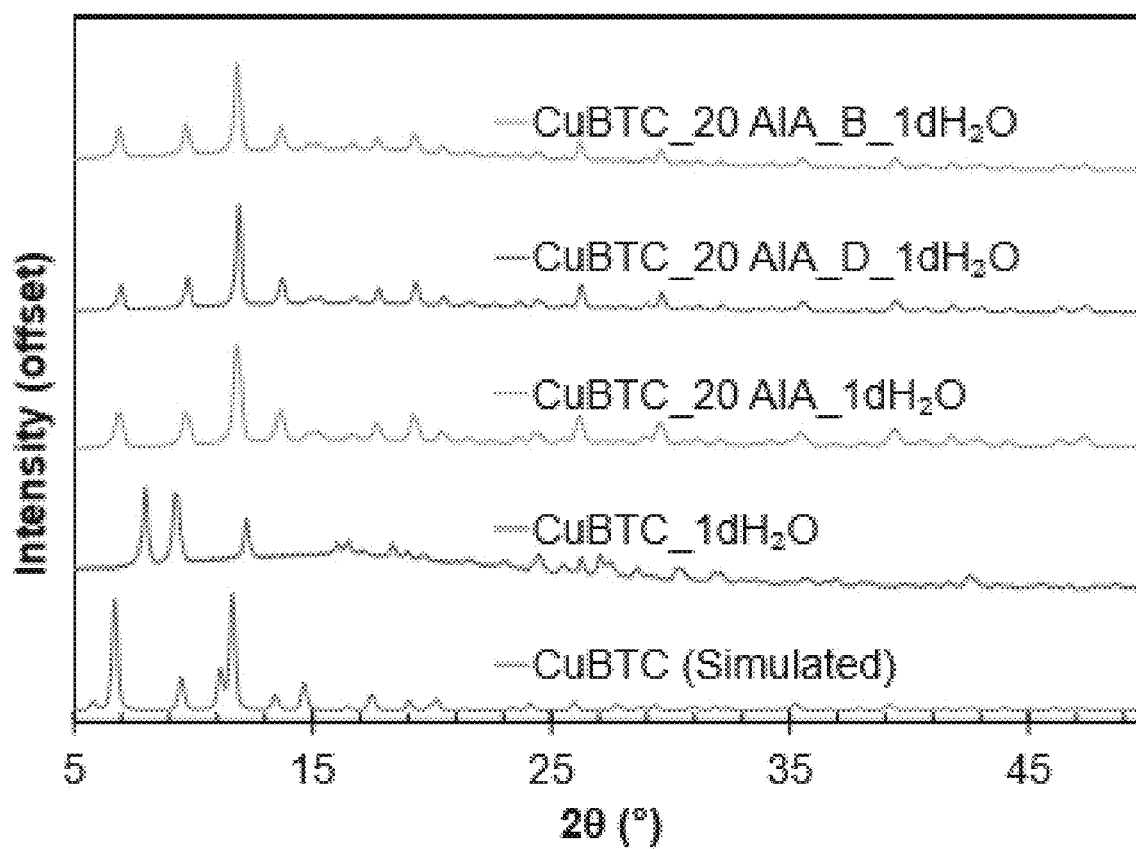
FIG. 12 is X-ray powder diffraction patterns of CuBTC, CuBTC_20 AIA_D, and CuBTC_20_AIA_B, (where B denotes 3,5-bis(trifluoromethyl)benzoyl chloride modification), all after 1 d exposure in liquid water.

FIG. 12 contains PXRD patterns for CuBTC, CuBTC_20 AIA, CuBTC_20 AIA_D, and CuBTC_20 AIA_B (B=3,5-bis(trifluoromethyl)benzoyl chloride) after 1 d exposure in liquid water. CuBTC degraded rapidly, while all other materials exhibited resistance to aging.

Example 6—Enhanced MOF-Polymer Compatibility

Modified MOFs are incorporated into polymer fibers and films to test the hypothesis that modification of the MOF enhances polymer compatibility. Polyacrylonitrile (PAN) fibers are made via electrospinning from solutions of 10% (w/v) PAN in dimethylformamide (DMF) and 10 wt % (w/w) MOF with respect to PAN. Electrospinning is conducted at 15 kV and a solution flow rate of 2 mL/min.

For films, 0.3 g polystyrene-block-polyisoprene-block-polystyrene (SIS) is mixed with ~0.02 g CuBTC, CuBTC_AIA and CuBTC_AIA_D materials in 3 mL tetrahydrofuran (THF). Films are cast with a 10 mil doctor blade on a Pyrex dish.

Figure 13A:
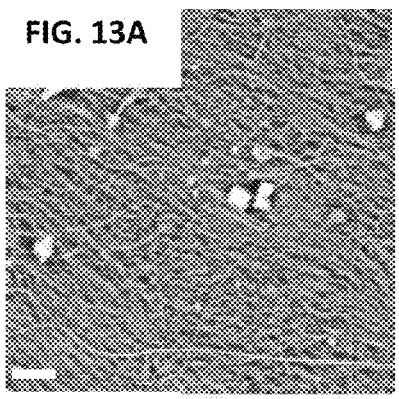
FIGS. 13A-13F are SEM micrographs of CuBTC (FIG. 13A, FIG. 13D), CuBTC_40 AIA (FIG. 13B, FIG. 13E), and CuBTC_40 AIA_D (FIG. 13C, FIG. 13F) in electrospun polyacrylonitrile (PAN) nanofibers (FIGS. 13A-13C) and SIS films (FIGS. 13D-13F) with a scale bars of 30 μm for FIGS. 13A-13C and 8 μm for FIGS. 13D-13F.
Figure 13B:
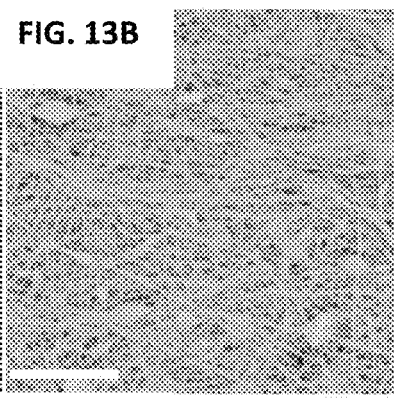
Figure 13C:
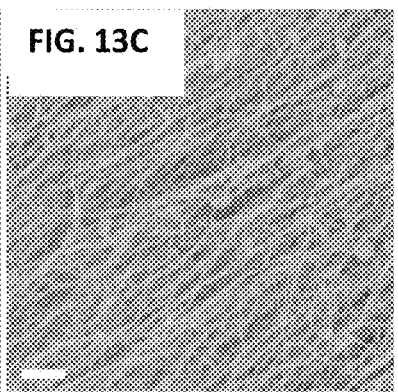
Figure 13D:
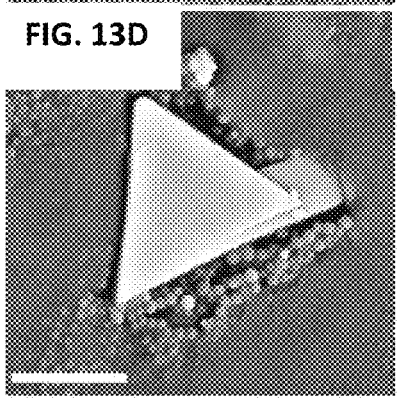
Figure 13E:
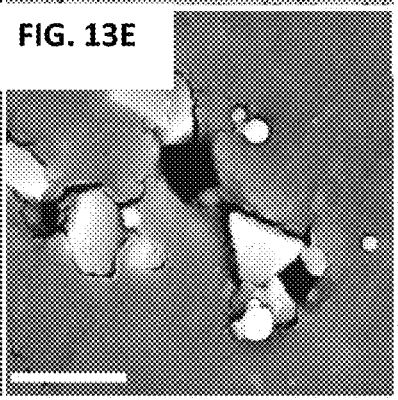
Figure 13F:
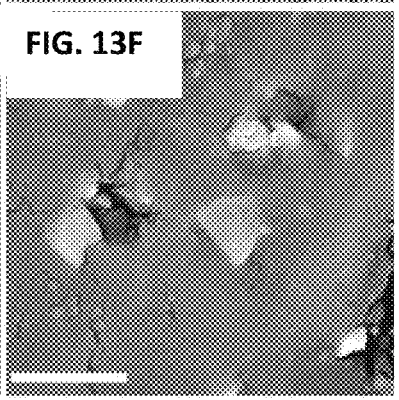

FIGS. 13A-E are SEM micrographs of CuBTC (FIGS. 13A and 13D), CuBTC_40 AIA (FIGS. 13B and 13E), and CuBTC_40 AIA_D (FIGS. 13C and 13F) in electrospun PAN nanofibers (FIGS. 13A-C) and SIS films (FIGS. 13D-F), with a scale bar of 30 microns for FIGS. 13A-C and a scale bar of 8 microns for FIGS. 13D-F. The sharp contrast between MOF and polymer in FIGS. 13A and 13D is indicative of poor interaction between the MOF and polymer, and major defects existed in both film and fiber form. Utilizing 40 mol % AIA enhanced interaction with PAN fibers, potentially through hydrogen bonding between the amine and cyanide group; however, major defects are still present in the SIS films. The addition of DC to CuBTC_40 ALA resulted in excellent compatibility with PAN fibers and also reduced defects with SIS films.

Example 7—Enhanced CO$_2$ Selectivity Over Water

Water isotherms are collected at 25° C. using a Cahn microbalance. Water is delivered from a saturator cell and mixed with diluent stream to achieve the required relative humidity (RH). Prior to measurement, samples are activated in nitrogen at 100° C. Approximately 1-5 mg of material are used for each test.

Figure 14:
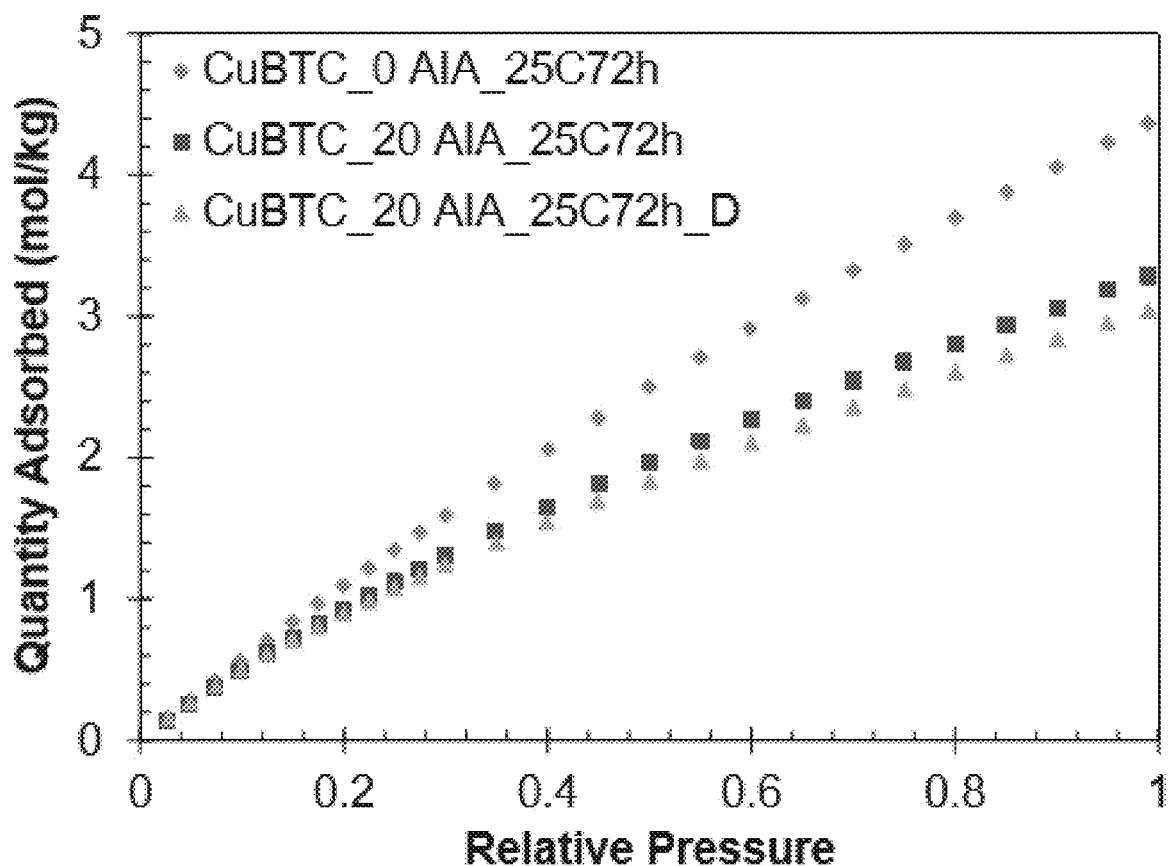
FIG. 14 is a series of plots of $CO_2$ isotherm data at 25° C. for CuBTC, CuBTC_20 AIA, and CuBTC_20 AIA_D.

FIG. 14 shows CO$_2$ isotherm data plots at 25° C. CuBTC had the highest CO$_2$ loading (4.4 mol·kg$^{-1}$ at 1 bar), while CuBTC_20 AIA and CuBTC_20 AIA_D had reduced loadings of 3.3 and 3.1 mol·kg$^{-1}$ at 1 bar, respectively.

Figure 15:
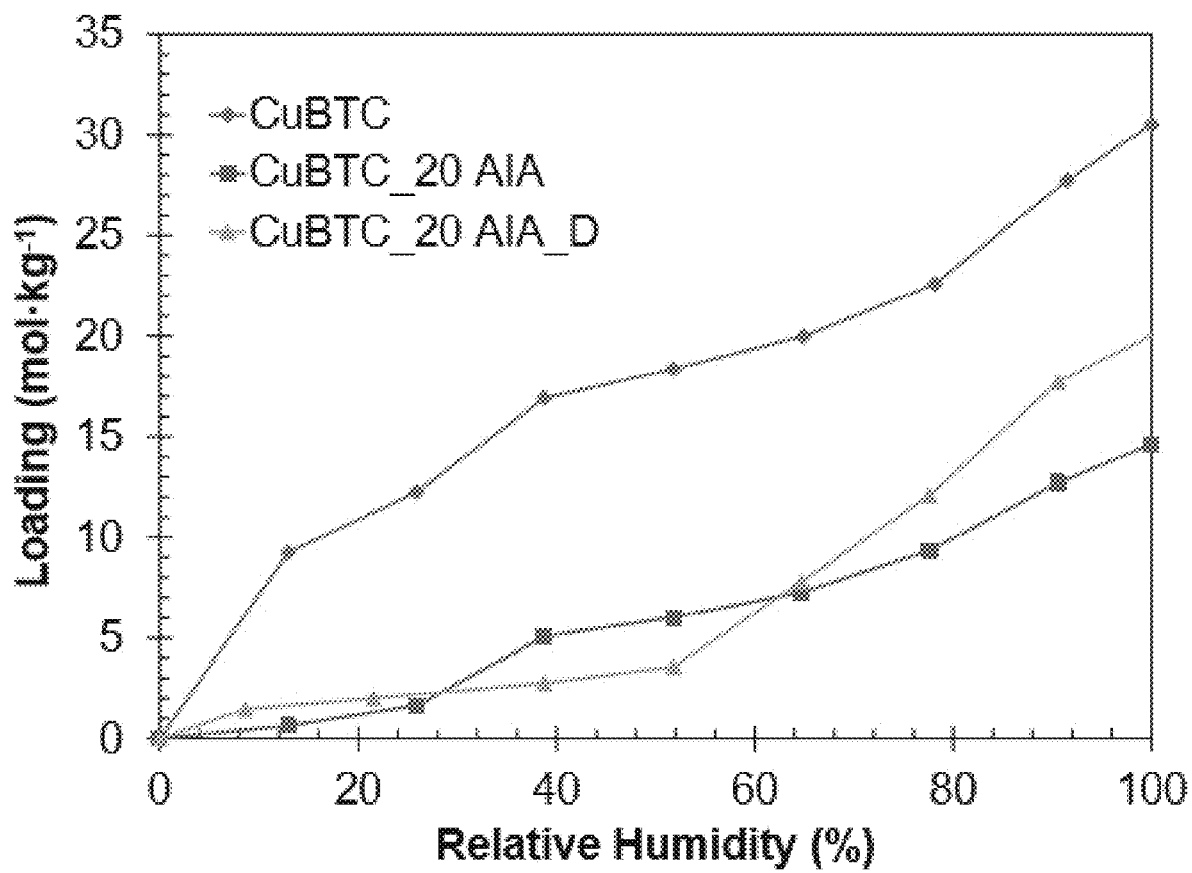
FIG. 15 is a series of a plots of $H_2O$ isotherm data at 25° C. for CuBTC, CuBTC_20 AIA, and CuBTC 20 AIA_D.

FIG. 15 shows a series of water isotherms for CuBTC, CuBTC_20 AIA, and CuBTC_20 AIA_D at 25° C. At saturation, the water loading was approximately 30 mol·kg$^{-1}$ (54 wt %). Interestingly, the ALA modification itself resulted in lower water uptake at low relative humidity. The reduced water uptake was unexpected as the amine itself lends itself to hydrogen bonding. At saturation, CuBTC_20 AIA and CuBTC_20 AIA_D had water loadings of 15 and 20 mol·kg$^{-1}$ (26 and 36 wt %), respectively.

Figure 16:
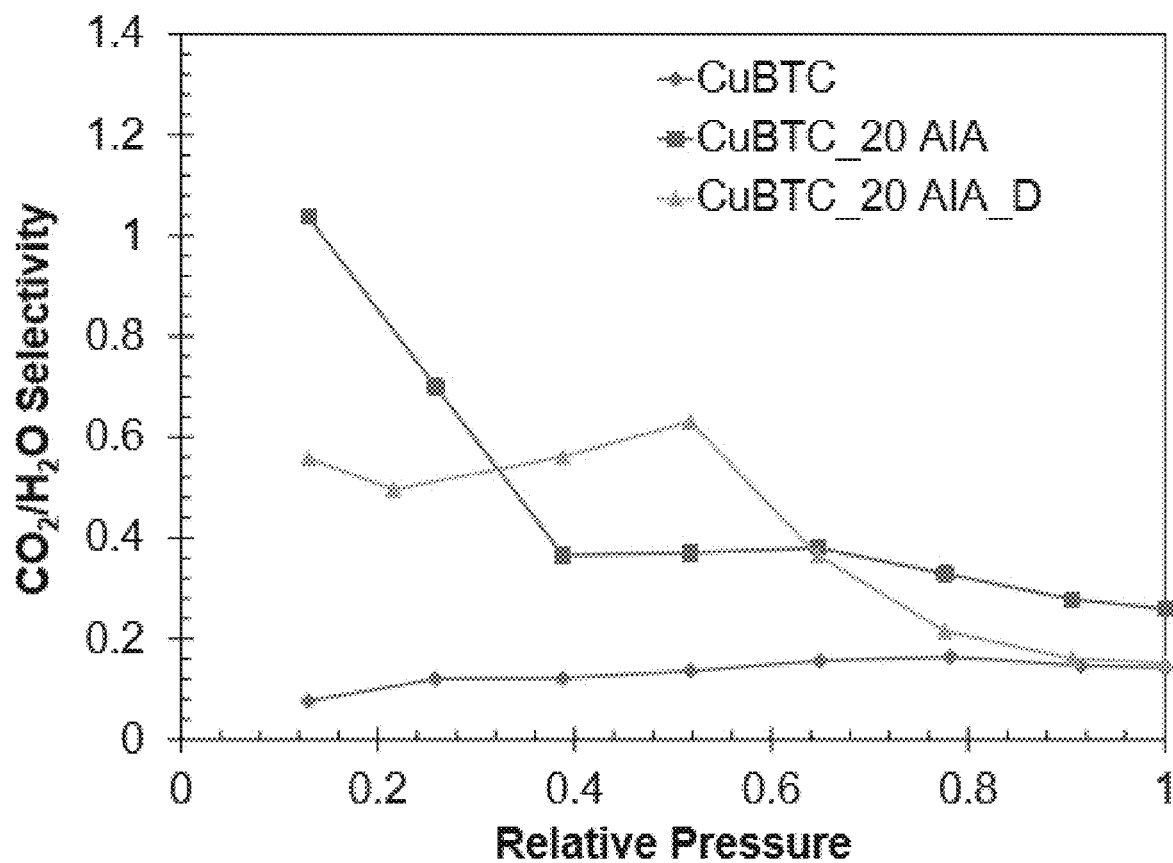
FIG. 16 is a series of plots of $CO_2/H_2O$ selectivity of CuBTC, CuBTC_20 AIA, and CuBTC_20 AIA_D as a function of RH conditions.

FIG. 16 is a series of plots of CO$_2$/H$_2$O selectivity of CuBTC, CuBTC_20 AIA, and CuBTC_20 AIA_D at a wide range of RH conditions.

Example 8—Enhanced CO$_2$ Selectivity Over N$_2$

CO$_2$ and N$_2$ adsorption isotherms are measured from 0 to 1 bar using a Micromeritics 3Flex 3500 instrument. Prior to measurement, samples are activated at 100° C. under vacuum (~1×10$^{-5}$ bar). CO$_2$/N$_2$ selectivity (a) is calculated from pure gas isotherms at conditions similar to flue gas concentrations according to the equation:

$$\alpha = \frac{n_{CO_2} P_{N_2}}{n_{N_2} P_{CO_2}}$$

in which PN$_2$ and PCO$_2$ are 0.75 and 0.15 bar, respectively, and nN$_2$ and nCO$_2$ are the adsorbed quantities of each gas at the respective pressure.

Figure 17:
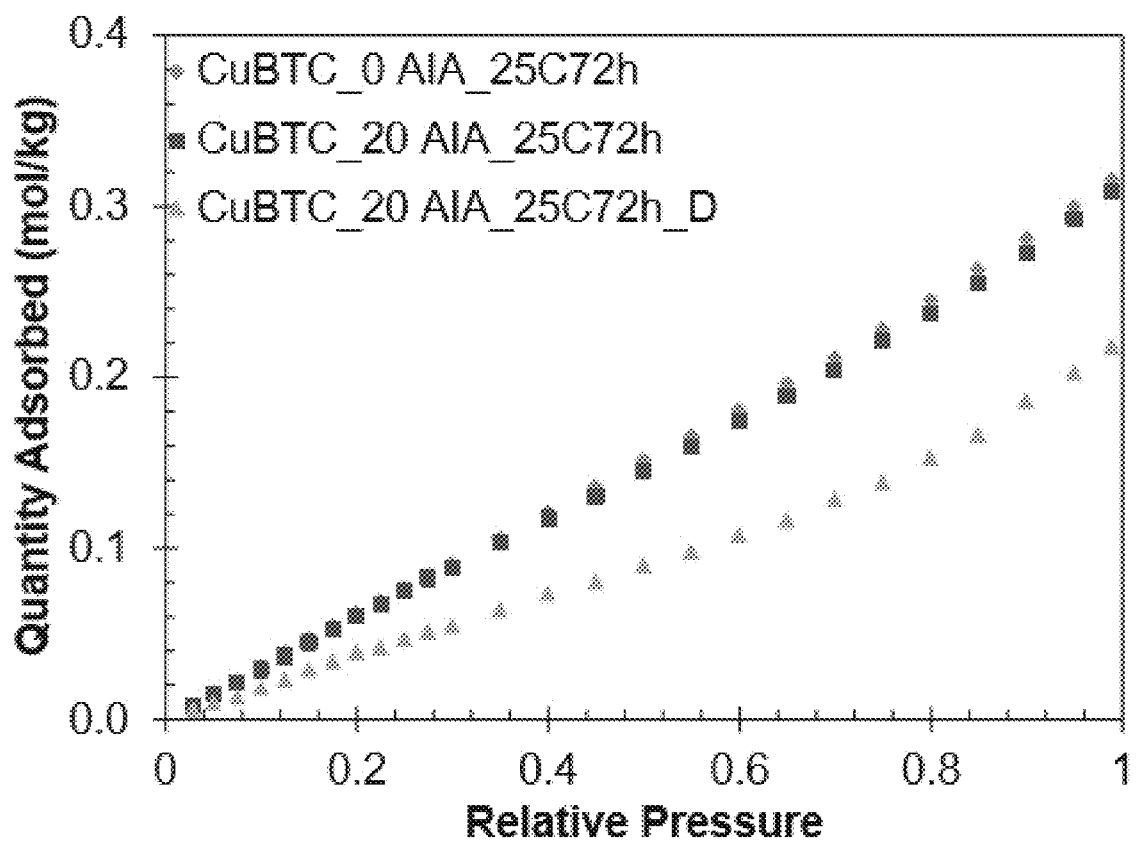
FIG. 17 is a series of plots of $N_2$ isotherm data at 25° C. for CuBTC, CuBTC_20 AIA, and CuBTC_20 AIA_D as function of relative pressure.

FIG. 17 shows a series of plots of nitrogen uptake of CuBTC, CuBTC_20 AIA, and CuBTC_20 AIA_D at 25° C. N$_2$ uptake is similar for both CuBTC and CuBTC_20 AIA for all relative pressures and adsorbed ~0.3 mol·kg$^{-1}$ at 1 bar. CuBTC_20 AIA_D, on the other hand, adsorbed significantly lower amounts of N$_2$, ~0.2 mol·kg$^{-1}$ at 1 bar, which is a 33% decrease. Assuming a flue gas stream consistent with PN$_2$=0.75 and PCO$_2$=0.15, a CO$_2$/N$_2$ selectivity of 18 and 16 is calculated for CuBTC and CuBTC_20 AIA, respectively. The resulting selectivity of CuBTC_20 AIA_D is 29, a 64% increase over the baseline CuBTC framework.

Figure 18:
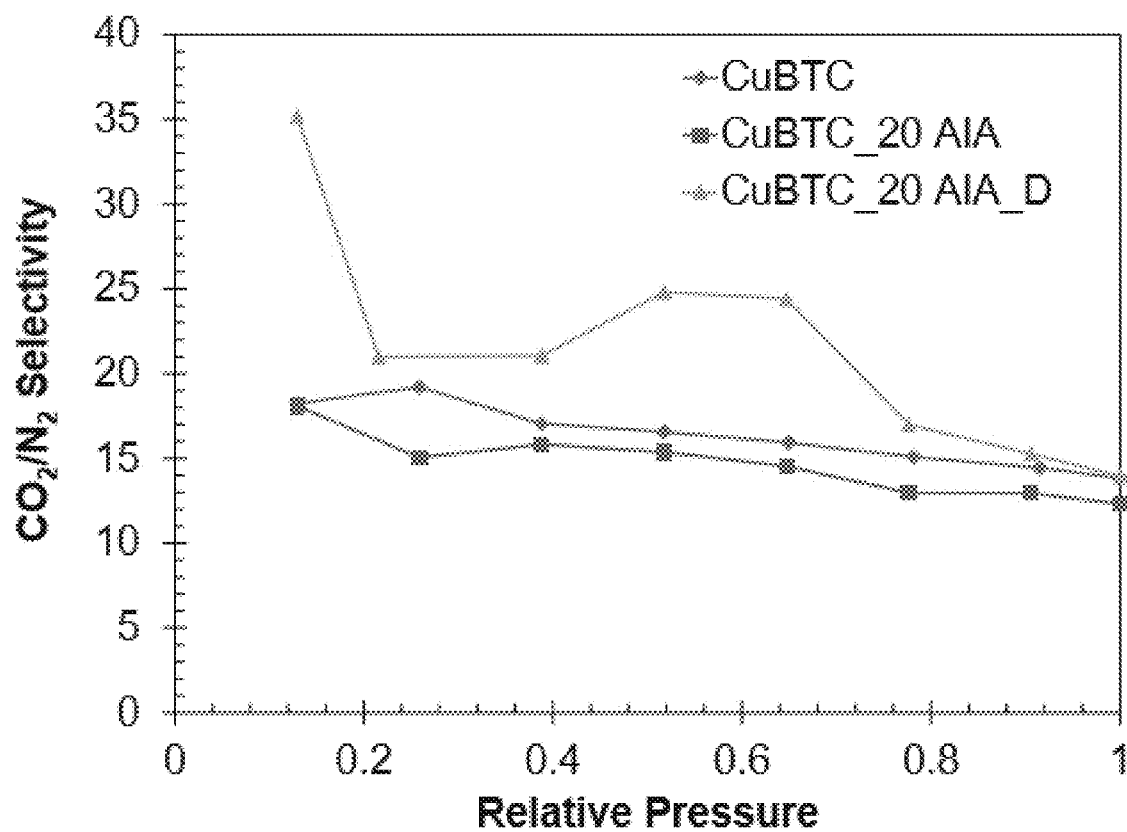
FIG. 18 is a series of plots of $CO_2/N_2$ selectivity of CuBTC, CuBTC_20 AIA, and CuBTC_20 AIA_D as a function of relative pressure.

FIG. 18. shows a series of plots of CO$_2$/N$_2$ selectivity over a range of relative pressures for CuBTC, CuBTC_20 AIA, and CuBTC_20 AIA_D. The DC-modified version had higher selectivity for CO$_2$ over the full range of relative pressures.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention, but is not meant to be a limitation upon the practice thereof. The following claims, including all equivalents thereof, are intended to define the scope of the invention.

The invention claimed is:

1. A composition consisting essentially of the structure of formula I:

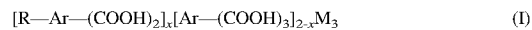

[R—Ar—(COOH)$_2$]$_x$[Ar—(COOH)$_3$]$_{2-x}$M$_3$     (I)

where M is Cu, Co, Fe, Zn, Cd, Ni, Mn, or Pt; R is a bromine, a primary amine, C$_1$-C$_4$ alkyl secondary amine, C$_1$-C$_4$ alkyl oxy, Br—(C$_1$-C$_4$ alkyl), NO$_2$—(C$_1$-C$_4$ alkyl), a mercaptan, and reaction products of any of the aforementioned with acyl chlorides of the formulas: CH$_3$(CH$_2$)$_m$C(O)Cl, or CH$_3$(CH(C$_1$-C$_4$ alkyl)CH$_2$)$_m$C(O)Cl, or CH$_3$(CH$_2$)$_m$-Ph-(CH$_2$)$_p$C(O)Cl, in which Ph is a C$_6$ phenyl group or C$_6$ phenyl group with one or more hydrogens replaced with F, C$_1$-C$_4$ fluoroalkyl, or C$_1$-C$_4$ perfluoroalkyl; m is independently in each occurrence an integer of 0 to 12 inclusive; p is an integer of 0 to 36 inclusive, to form an amide, a thioamide, or an ester; Ar is a 1,3,5-modified phenyl group, and x is a non-integer value of greater than 0 and less than 1.4.

2. The composition of claim 1, wherein x is between 0.1 and 1.24.

3. The composition of claim 1, wherein R—Ar—(COOH)$_2$ is independently in each occurrence 5-aminoisophthalic acid, 5-methoxyisophthalic acid, or 5-thioisophthalic acid.

4. The composition of claim 1, wherein R—Ar—(COOH)$_2$ is 5-aminoisophthalic acid in every occurrence.

5. The composition of claim 2, wherein M is Cu.

6. The composition of claim 1, wherein M is Cu and R—Ar—(COOH)$_2$ is 5-aminoisophthalic acid.

7. The composition of claim 1, wherein an amide bond is present.

8. The composition of claim 1, further comprising a polymeric substrate.

9. The composition of claim 8, wherein said polymeric substrate is a fiber.

10. The composition of claim 8, wherein said polymeric substrate is polyimide, polystyrene, polyurethane, poly(vinylidene fluoride), poly(ethylene oxide) or poly(ethylene glycol), polyacrylonitrile, poly(vinyl chloride), sulfonated tetrafluoroethylene, poly(styrene-butadiene-styrene), poly(styrene-isoprene-styrene), poly(acrylonitrile-butadiene-styrene), poly(styrene-ethylene-butadiene-styrene), poly(styrene-ethylene-propylene-styrene), polydimethylsiloxane, polychloroprene, latex, low-density polyethylene, first grade polyethylene, polypropylene, albumin, poly(vinyl alcohol), polyethylenimine, polyvinylpyrrolidone, poly(ethylene-vinyl acetate), polyethylene-vinyl acetate, or a combination thereof.

\* \* \* \* \*